United States Patent
Ohtake

(10) Patent No.: US 8,547,028 B2
(45) Date of Patent: Oct. 1, 2013

(54) CONSTANT CURRENT POWER SUPPLY DEVICE

(75) Inventor: Osamu Ohtake, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 122 days.

(21) Appl. No.: 13/311,026

(22) Filed: Dec. 5, 2011

(65) Prior Publication Data

US 2012/0161654 A1   Jun. 28, 2012

(30) Foreign Application Priority Data

Dec. 27, 2010  (JP) .................................. 2010-289796

(51) Int. Cl.
*H05B 37/02* (2006.01)
*H02M 3/335* (2006.01)
(52) U.S. Cl.
USPC .................................. 315/200 R; 363/21.02
(58) Field of Classification Search
None
See application file for complete search history.

(56) References Cited

U.S. PATENT DOCUMENTS

| 8,148,906 B2* | 4/2012 | Yamamuro et al. | 315/219 |
| 8,330,440 B2* | 12/2012 | Wachi | 323/282 |
| 2010/0060204 A1* | 3/2010 | Ohtake et al. | 315/307 |
| 2011/0084623 A1* | 4/2011 | Barrow | 315/250 |
| 2011/0193481 A1* | 8/2011 | Nakamura | 315/82 |

FOREIGN PATENT DOCUMENTS

| JP | 2008-27874 | 2/2008 |
| JP | 2009-238633 | 10/2009 |

* cited by examiner

*Primary Examiner* — Shawki Ismail
*Assistant Examiner* — Nelson Correa
(74) *Attorney, Agent, or Firm* — Oblon, Spivak, McClelland, Maier & Neustadt, L.L.P.

(57) ABSTRACT

A constant current power supply device according to the present invention includes: an error amplifier to amplify an error signal of an error voltage between a voltage of a current detection resistor and a reference voltage, and a second control circuit to sample and hold the error signal in an ON period of the external signal, output the error signal to a first control circuit, hold the error signal just before the external signal is turned from ON to OFF, increase an amplification ratio of the error amplifier by a predetermined magnification ratio in an OFF period of the external signal, and output the increased error signal to the first control circuit.

5 Claims, 7 Drawing Sheets

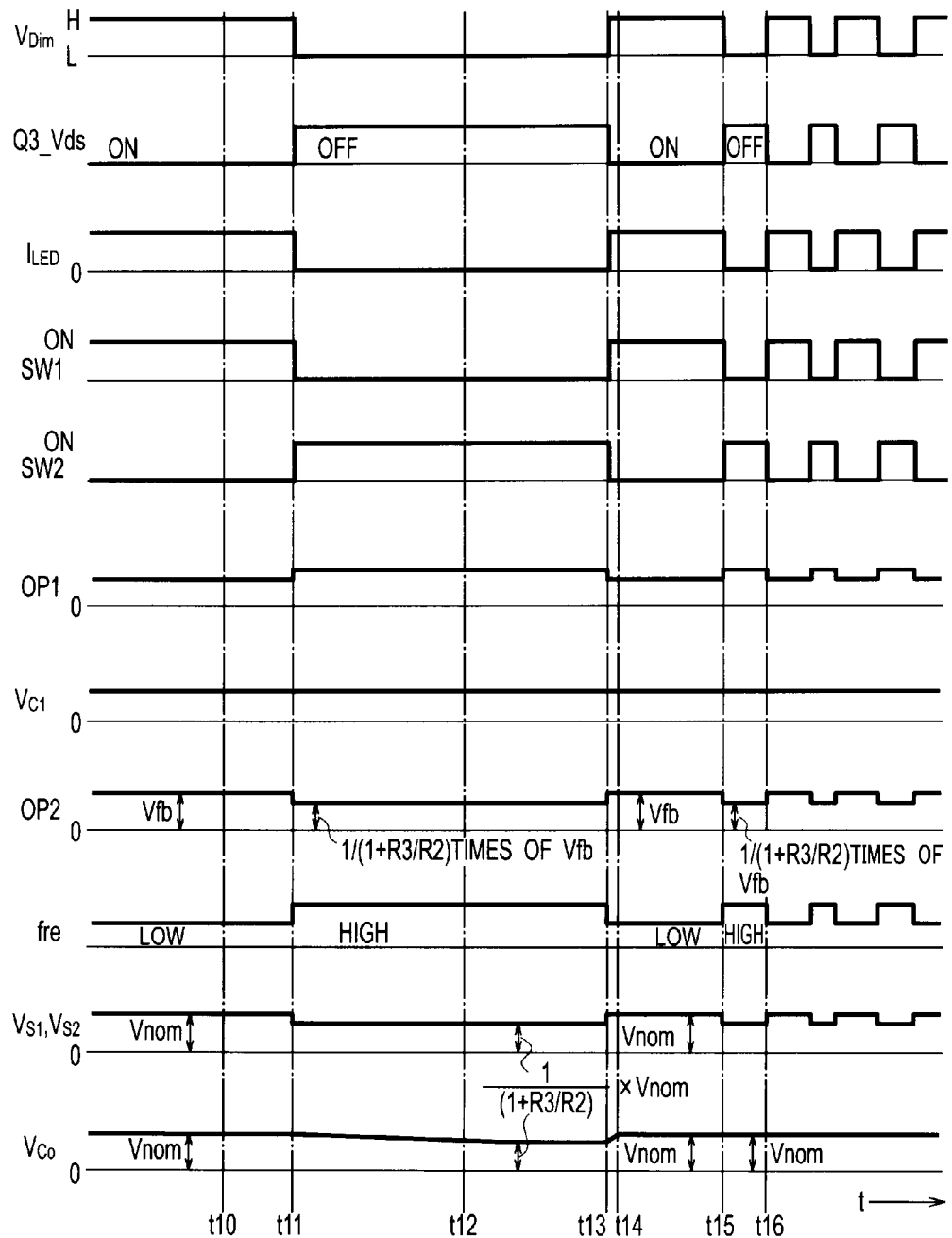

CONSTANT CURRENT POWER SUPPLY DEVICE

TECHNICAL FIELD

The present invention relates to a constant current power supply device configured to turn on and off a switch element connected in series to a load, for example an LED, and thereby light on the LED by flowing a constant current into the LED.

BACKGROUND ART

Related arts known as those in this technical filed are disclosed in Japanese Patent Application Publications Nos. 2009-238633 and 2008-27874. An LED lighting device described in Japanese Patent Application Publication No. 2009-238633 prevents a rise of the output voltage by flowing a standby current while the LED is off. The standby current is flowed by driving a switching power supply at a pre-lighting duty ratio set to obtain a voltage lower than an output voltage applied when the LED is turned on and also by turning on a bypass circuit serving as a dummy load connected in parallel with the LED.

A light irradiation system described in Japanese Patent Application Publication No. 2008-27874 includes a driving unit configured to supply an operating current based on an instruction value of an LED operating current in an ON period when the LED is lighted, and actively supply a standby current that is lower than the operating current and is based on an instruction value of the standby current, before the ON period starts while the LED is off.

Arts described in Japanese Patent Application Publications Nos. 2009-238633 and 2008-27874 prevent a drop of the output voltage by flowing a predetermined standby current all the time when the LED is off, and also prevent a temporary shortage of LED illumination intensity that would otherwise occur because the LED operating current does not reach a given value during a rise time of the output voltage due to a delay of the output voltage rise in the rise time for turning on the LED.

However, the flowing of the predetermined standby current while the LED is off leads to a waste of energy.

Further, according to Japanese Patent Application Publication No. 2009-238633, the output voltage in the standby mode is reduced by switching the output current in the lighting mode to the standby current in the standby mode. That is, use of a feedback control signal for reducing the output voltage in the standby mode is not enough to prevent power supply to an output from a transformer by a switching operation, and thereby causing the output voltage to rise slightly. The standby current is a load current for consuming the power supplied by the switching operation. Also requiring a standby current, the technique described in Japanese Patent Application Publication No. 2008-27874 is considered to use a converter similar to the one described in Japanese Patent Application Publication No. 2009-238633.

An object of the present invention is to provide a constant current power supply device capable of controlling an output voltage at a setup voltage lower than an operating voltage without flowing a standby current.

SUMMARY OF THE INVENTION

A constant current power supply device according to the present invention includes: a direct current power supply; a first series circuit connected to both ends of the direct current power supply, and including a first switching element and a second switching element connected together in series; a first control circuit configured to turn ON/OFF the first switching element and the second switching element alternately; a second series circuit connected to both ends of the first switching element or the second switching element, and including a reactor, a primary winding of a transformer and a current resonance capacitor connected together in series; a rectifying and smoothing circuit configured to output an output voltage by rectifying and smoothing a voltage generated in a secondary winding of the transformer; a third series circuit connected to both ends of the rectifying and smoothing circuit, and including a load, a switching element and a current detection resistor connected together in series, the switching element configured to control ON/OFF of a load current flowing into the load according to an ON/OFF signal received from an external signal; an error amplifier configured to amplify an error signal indicating a difference between a voltage of the current detection resistor and a reference voltage; and a second control circuit configured to sample and hold the error signal from the error amplifier when the external signal is in an ON period, output the error signal to the first control circuit, hold the error signal just before the external signal is turned from ON to OFF, change an amplification ratio of the error amplifier by a predetermined magnification ratio when the external signal is in an OFF period, and output the changed error signal to the first output circuit.

BRIEF DESCRIPTION OF THE DRAWINGS

FIG. 7 is a waveform chart showing operations of respective components of the constant current power supply device according to the second embodiment of the present embodiment.

DESCRIPTION OF EMBODIMENTS

Hereinafter, embodiments of a constant current power supply device according to the present invention are described in detail with reference to the accompanying drawings.

First Embodiment

Figure 1:
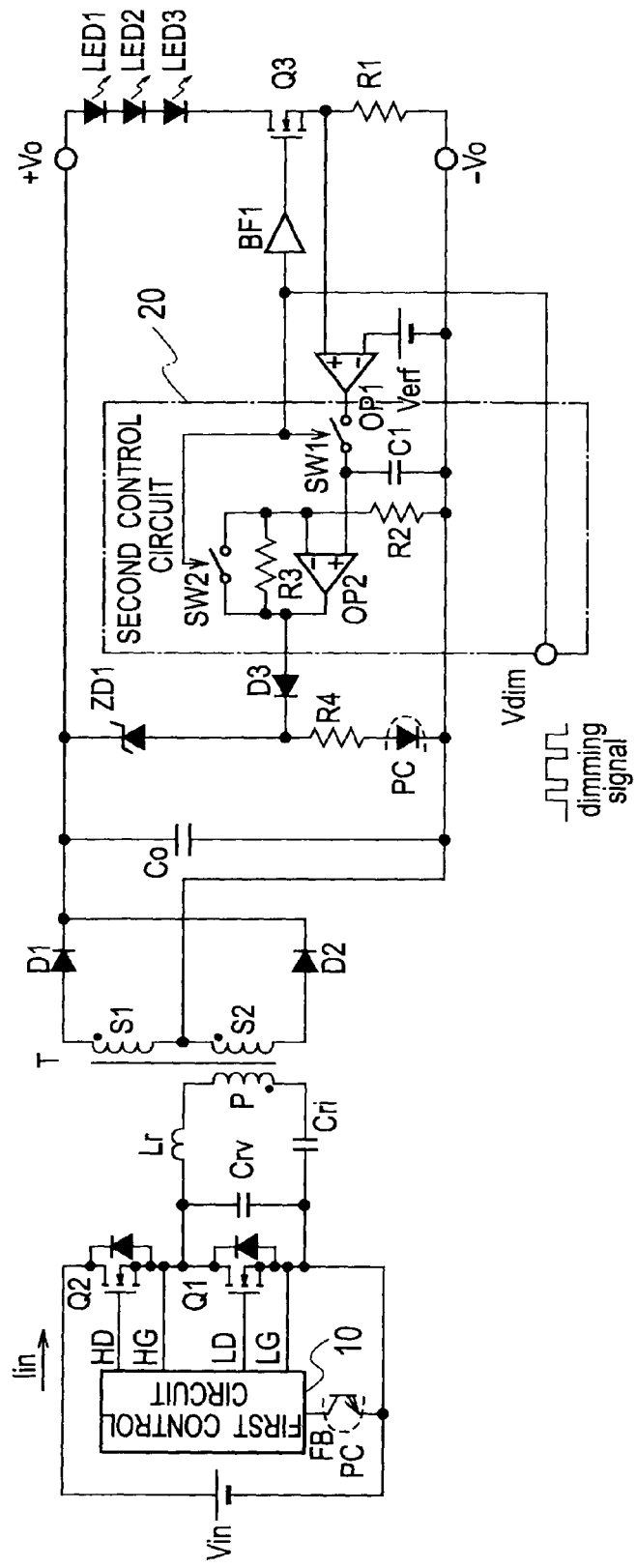
FIG. 1 is a block diagram showing a configuration of a constant current power supply device according to a first embodiment of the present invention.

FIG. 1 is a block diagram showing a configuration of a constant current power supply device according to a first embodiment of the present invention. The constant current power supply device shown in FIG. 1 is an example of the present invention applied to an LED lighting device and includes a full-wave current resonance DC-DC converter configured to perform a constant current control of an LED output current.

In the constant current power supply device shown in FIG. 1, a first series circuit including a switching element Q1 consisting of a MOSFET and a switching element Q2 consisting of a MOSFET is connected to both ends of a DC power supply Vin. Between a drain and a source of the switching element Q1, a voltage resonance capacitor Cry is connected in parallel, and a second series circuit including a resonance reactor Lr, a primary winding P of a transformer T and a current resonance capacitor is connected in parallel.

The voltage resonance capacitor Cry and the second series circuit may be connected between a drain and a source of the switching element Q2 instead of between the drain and the source of the switching element Q1. A first control circuit 10 performs alternate on/off control of the switching element Q1 and the switching element Q2 according to a feedback signal sent from a feedback terminal FB.

A first secondary winding S1 and a second secondary winding S2 of the transformer T are connected together in series. An anode of a diode D1 is connected to one end of the first secondary winding S1, and an anode of a diode D2 is connected to one end of the second secondary winding S2. A cathode of the diode D1 and a cathode of the diode D2 are connected to each one end of a capacitor Co, a cathode of a zener diode ZD1 and an anode of a load LED 1. A connection point between the first secondary winding S1 and the second secondary winding S2 is connected to another end of the capacitor Co.

To both ends of the capacitor Co, a series circuit including the zener diode ZD1, a resistor R4 and a photodiode of a photocoupler PC is connected, and a series circuit including loads LED1 to LED3 connected together in series, a switching element Q3 consisting of a MOSFET and a current detection resistor R1 are connected.

Output of a buffer circuit BF1 is connected to a gate of the switching element Q3, and a dimming signal Vdim (external signal) for turning ON/OFF the loads LED1 to LED3 is applied to the gate of the switching element Q3 via a dimming terminal and the buffer circuit BF1 to turn the loads LED1 to LED3 on and off. The dimming signal Vdim performs on/off control of a switch SW1 and a switch SW2.

An error amplifier OP1 forming a constant current error amplifier amplifies an error voltage between a voltage at both ends of the current detection resistor R1 and a reference voltage Vref, and outputs an amplified error voltage as an error signal to the one end of the switch SW1. Another end of the switch SW1 is connected to one end of a capacitor C1 and a non-inverting input terminal of an error amplifier OP2.

The error amplifier OP1, the reference voltage Vref and the current detection resistor R1 perform constant current control of the loads LED1 to LED3. The error amplifier OP2, the capacitor C1 and resistors R2 and R3 are provided to sample and hold a signal of the error amplifier OP1.

To an inverting input terminal of the error amplifier OP2, one end of the resistor R2, one end of the resistor R3 and one end of the switch SW2 are connected. Another end of the resistor R3 and another end of the switch SW2 are connected to an output terminal of the error amplifier OP2 and an anode of a diode D3. A cathode of the diode D3 is connected to an anode of the zener diode ZD1, and one end of the resistor R4, and another end of the resistor R4 is connected to an anode of the photodiode of the photocoupler PC.

Another end of the current detection resistor R1, a negative electrode of the reference power supply Vref, another end of the capacitor C1, another end of the resistor R2, a cathode of the photodiode of the photocoupler PC and another end of the capacitor Co are connected common.

A phototransistor of the photocoupler PC is connected to the feedback terminal FB of the first control circuit 10, and a feedback signal detected by the current detection resistor R1 is outputted to the first control circuit 10 via the feedback terminal FB.

Switches SW1 and SW2 are turned ON when the dimming signal Vdim is turned ON, and are turned OFF when the dimming signal Vdim is turned OFF. The error amplifiers OP2, the switches SW1, SW2, the capacitor C1, and the resistors R2, and R3 form the second control circuit. The second control circuit samples and holds an error signal received from the error amplifier OP1, outputs the error signal to the first control circuit 10, holds the error signal just before the dimming signal Vdim is turned from ON to OFF, and increases the amplification factor (gain) of the error amplifier OP1 by a predetermined magnification ratio in the OFF period of the dimming signal Vdim.

Figure 2:
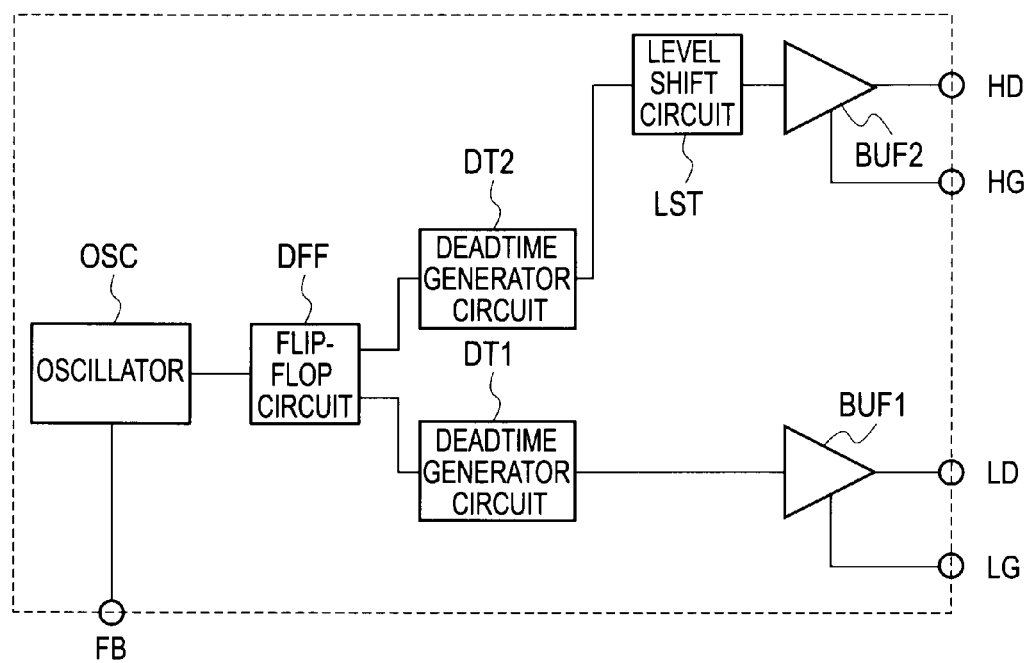
FIG. 2 is a block diagram showing a configuration of control circuits in the constant current power supply device according to the first embodiment of the present invention.

Next, operation of the switching elements Q1, Q2 of the constant current power supply device according to the first embodiment is described with reference to FIGS. 1 to 3.

When a supply voltage Vin is applied, a startup circuit (not shown) activates operation of the first control circuit 10. As shown in FIG. 2, the first control circuit 10 includes an oscillator OSC, a flip-flop circuit DFF, dead time generator circuits DT1, DT2, a level shift circuit LST, and buffer circuits BUF1, BUF2.

The oscillator OSC generates a pulse signal with the oscillation frequency changed according to a signal level of the feedback signal received from the feedback terminal FB. Specifically, the oscillator OSC generates a pulse signal with an oscillation frequency which is increased with a decrease in the load from a heavy level to none.

The flip-flop circuit DFF outputs two pulse signals each having a duty of 50% and alternately turning ON/OFF based on a pulse signal received from the oscillator OSC.

One pulse signal is outputted to a low-side gate of the switching element Q1 via the dead time generator circuit DT1 and the buffer circuit BUF1. Another pulse signal is outputted to a high-side gate of the switching element Q2 via the dead time generator circuit DT2, the level shift circuit LST and a buffer circuit BUF2. That is, the switching elements Q1, Q2 have dead times generated by the dead time generator circuits DT1, DT2 and alternately turn ON/OFF.

Figure 3A:
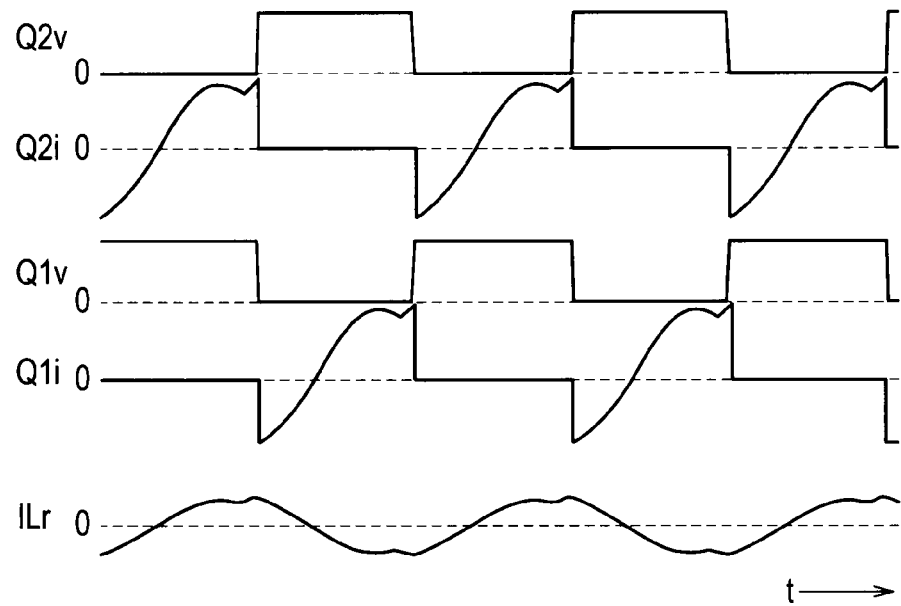
FIGS. 3A and 3B each show a waveform chart showing switching operations of switching elements Q1, Q2 in the constant current power supply device according to the first embodiment of the present invention.
Figure 3B:
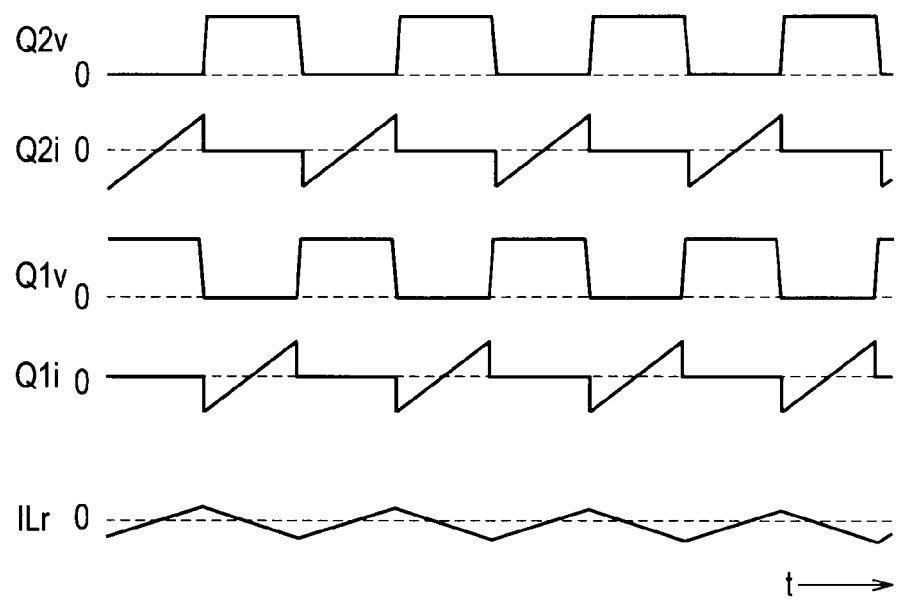

FIGS. 3A and 3B each show a waveform chart of the following components. In FIGS. 3A and 3B, Q2v, Q2i, Q1v, Q1i, and ILr represent a drain-source voltage of the switching element Q2, a drain current of the switching element Q2, a drain-source voltage of the switching element Q1, a drain current of the switching element Q1, and a current flowing through the reactor Lr, respectively. FIG. 3A shows a waveform chart when 100% of Vin=400V load is applied, and FIG. 3B shows a waveform chart when 0% of Vin=400V load (no load) is applied.

When the switching element Q2 is turned ON, the current Q2i flows via Vin, Q2, Lr, P, Cri and Vin in this order. The current Q2i is supplied, along with an exciting current which flows through a primary inductance Lp (not shown) of the transformer T, from output terminals +Vo, −Vo to a load via the primary wiring P of the transformer T, the secondary winding S2 of the transformer T, the diode D2 and the capacitor Co, and becomes a composite current synthesized with a load current.

That is, the former current becomes a sinusoidal resonance current generated by (reactor Lr+Inductance Lp) and a current resonance capacitor Cri. Since a resonance frequency is low compared to the ON period of the switching element Q2, part of the sinusoidal wave is observed as a triangular-wave current. The latter current becomes a sinusoidal resonance current reflecting resonance factor of the reactor Lr and the current resonance capacitor Cri.

When the switching element Q2 is turned OFF, the energy of an exciting current stored in the transformer T causes a voltage quasi resonance by (reactor Lr+inductance Lp), the current resonance capacitor Cri and a voltage resonance capacitor Crv. Resonance frequency by the voltage resonance capacitor Cry having low capacitance is observed as a voltage between both ends of the switching elements Q1, Q2.

That is, the current Q2$i$ of the switching element Q2 shifts to the voltage resonance capacitor Cry when the switching element Q2 is turned OFF. When the voltage resonance capacitor Cry is discharged to zero voltage, the current shifts to a built-in diode of the switching element Q1. Energy by the exciting current stored in the transformer T is charged into the voltage resonance capacitor Cri via the built-in diode of the switching element Q1. By turning the switching element Q1 ON during this period, a zero voltage switch of the switching element Q1 can be achieved.

When the switching element Q1 is turned ON, the current Q1$i$ flows through the path of Cri-P-Lr-Q1-Cri with the current resonance capacitor Cri as a power supply. The current Q1$i$ becomes a composite current synthesized with an exciting current which flows through the inductance Lp of the transformer T and a load current which is supplied from output terminals +Vo, −Vo to a load via the primary winding P, the secondary winding S1, the diode D1 and the capacitor Co. That is, the former current becomes a sinusoidal resonance current generated by (reactor Lr+Inductance Lp) and a current resonance capacitor Cri. Since a resonance frequency is low compared with the ON period of the switching element Q1, part of the sinusoidal wave is observed as a triangular-wave current. The latter current becomes a sinusoidal resonance current reflecting resonance factor of the reactor Lr and the current resonance capacitor Cri.

When the switching element Q1 is turned OFF, energy of the exciting current stored in the transformer T causes a voltage quasi resonance by (reactor Lr+inductance Lp), the current resonance capacitor Cri and a voltage resonance capacitor Crv. Resonance frequency by the voltage resonance capacitor Cry having low capacitance is observed as a voltage between both ends of the switching elements Q1, Q2.

That is, the current Q1$i$ of the switching element Q1 shifts to the voltage resonance capacitor Cry when the switching element Q1 is turned OFF. When the voltage resonance capacitor Cry is discharged to zero voltage, the current shifts to a built-in diode of the switching element Q2. Energy by the exciting current stored in the transformer T is regenerated into the DC power supply Vin via the built-in diode of the switching element Q2. By turning the switching element Q2 ON during this period, a zero voltage switch of the switching element Q2 can be achieved.

Comparing FIG. 3A and FIG. 3B, it can be understood that output current is controlled by controlling the oscillation frequency of the oscillator OSC.

The second control circuit 20 detects an output current flowing through LED1 to LED3 and supplies the detected output current as a feedback signal to the first control circuit 10 via the photocoupler PC and the feedback terminal FB. The oscillator OSC performs a feedback control by changing the oscillation frequency according to a signal level of the feedback signal.

Figure 4:
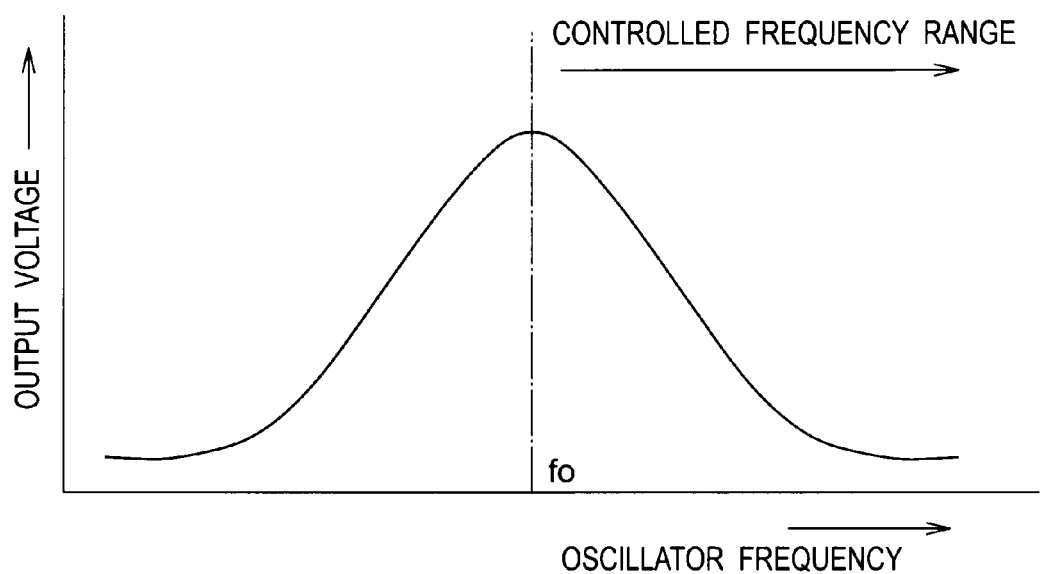
FIG. 4 is a chart showing a relation between an output voltage and an oscillation frequency of a full-wave current resonance type DC-DC converter.

FIG. 4 is a chart showing a relation between an output voltage and an oscillation frequency of the full-wave current resonance type DC-DC converter. As shown in FIG. 4, a frequency higher than a resonance frequency of the reactor Lr and the current resonance capacitor Cri is used.

Next, operation of the constant current power supply device according to the first embodiment is described with reference to a waveform chart shown in FIG. 5.

Figure 5:
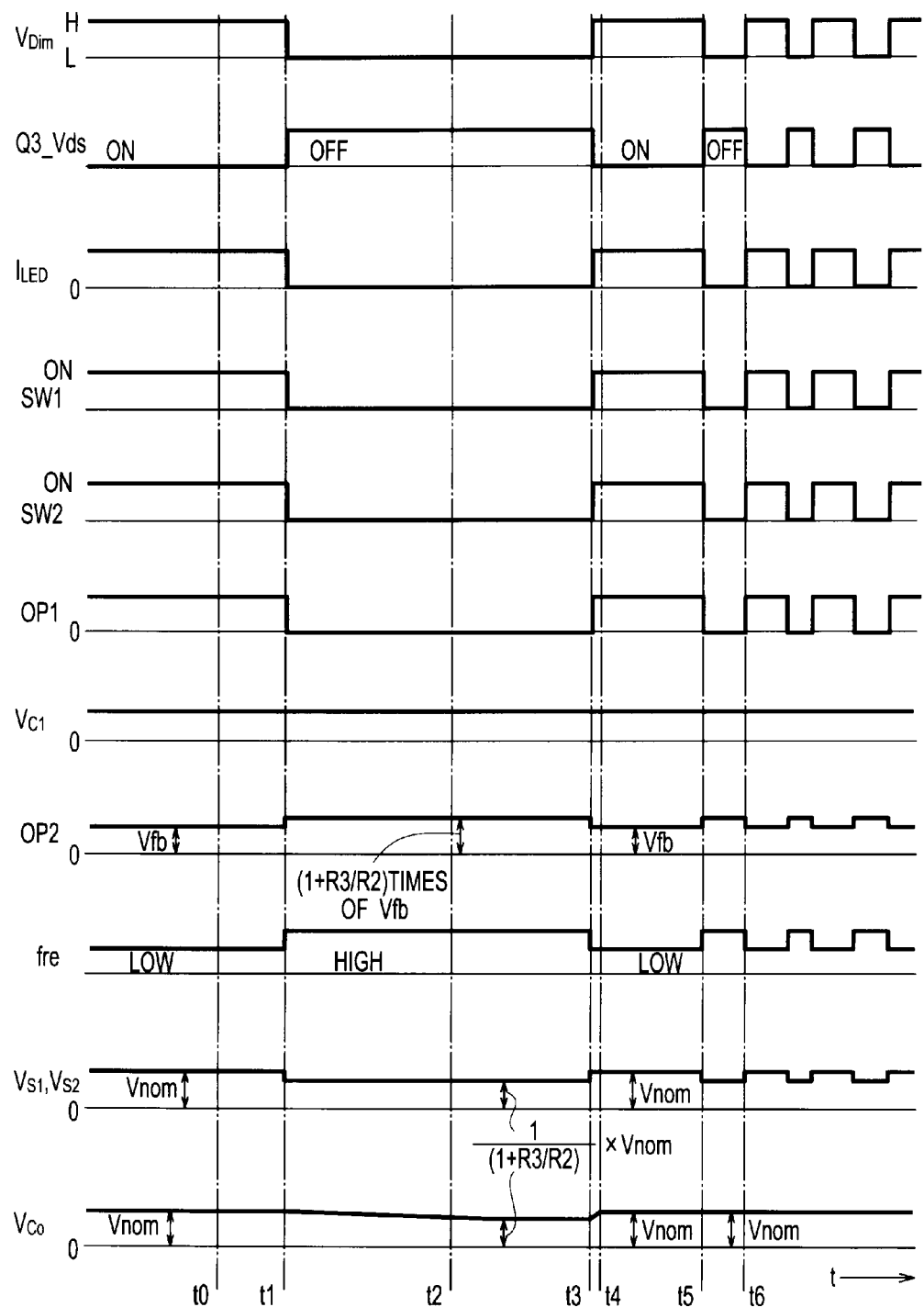
FIG. 5 is a waveform chart showing operations of respective components of the constant current power supply device according to the first embodiment of the present invention.

In FIG. 5, Vdim, Q3Vds, I LED, SW1, SW2, OP1, OP2, Vc1, fre, Vs1, Vs2 and Vco represent the dimming signal, a drain-source voltage of the switching element Q3, a current flowing through LED1 to LED3, an ON/OFF signal of the switch SW1, an ON/OFF signal of the switch SW2, an output voltage of the error amplifier OP1, an output voltage of the error amplifier OP2, a voltage between both ends of the capacitor C1, an oscillation frequency of the oscillator OSC, a voltage between both ends of the first secondary winding S1, a voltage between both ends of the second secondary winding S2, and a voltage between both ends of the capacitor Co, respectively.

At time t0, a MOSFET Q3 is turned ON/OFF according to the dimming signal Vdim to flow an ON/OFF current to loads LED1 to LED3. When the MOSFET Q3 is turned ON, a load current flows into the current detection resistor R1, and a voltage between both ends of the current detection resistor R1 is compared with a reference voltage Vref by the error amplifier OP1. The capacitor C1 is charged via the switch SW1 by an error signal outputted from an output terminal of the error amplifier OP1, and at the same time, the error signal is inputted into a non-inverting terminal of the error amplifier OP2.

Switches SW1, SW2 are turned ON/OFF in synchronization with a H/L level of the dimming signal Vdim. Thus, since the switch SW2 is in the ON state when the dimming signal Vdim is at the H level, the resistor R3 connected between the output terminal and inverting input terminal of the error amplifier OP2 is short-circuited by the switch SW2. For this reason, the error amplifier OP2 becomes a voltage follower operating such that the inverting input terminal voltage becomes a voltage same as the non-inverting input terminal voltage.

In consequence, the error amplifier OP2 applies the error signal, received from the error amplifier OP1, to the photodiode of the photocoupler PC via the diode D3 and sends the error signal to the first control circuit 10 via the photocoupler PC.

Thus, based on the error signal received from the error amplifier OP1, the current resonance power supply circuit controls such that a current flowing through loads LED1 to LED3 becomes a constant current.

When the current flowing into the photocoupler PC increases, the oscillation frequency increases, thereby causing to decrease the output voltage. When the current flowing into the photodiode PC decreases, the oscillation frequency decreases, thereby causing to increase the output voltage.

Next, at time t1, when the dimming signal Vdim is turned OFF to the L level, the MOSFET Q3 and switches SW1, SW2 are turned OFF, and the current flowing through loads LED1 to LED3 stops.

Here, since the switch SW1 is turned OFF, an error signal received from the error amplifier OP1 when a voltage between both ends of the current detection resistor R1 is zero volt is not inputted to the feedback terminal FB of the first control circuit 10 in the current resonance power supply circuit, and instead, a charge voltage of the capacitor C1 holding a signal received in the constant current mode is inputted continuously. However, since the switch SW2 is also turned OFF simultaneously, the gain of the error amplifier OP2 changes to an amplification ratio corresponding to a ratio of the resistor R3 being a negative feedback resistor to an input resistor R2 of the inverting input terminal. The amplification ratio (gain) of the error amplifier OP2 in this state is (1+R3/R2) times of the amplification ratio of the error amplifier OP1. Thus, a charge voltage of the capacitor C1 amplified by (1+R3/R2) times is applied to the photodiode of the photocoupler PC. In consequence, the current resonance power supply circuit is controlled so as to generate an output voltage of 1/(1+R3/R2) times of the output voltage in the constant current mode.

As described above, the current resonance power supply circuit operates to suppress power supply by increasing the oscillation frequency so as to control the output voltage so that the output voltage can be 1/(1+R3/R2) times of the output voltage in the constant current operation.

That is, when a charge voltage of the capacitor C1 amplified just by the (1+R3/R2) times is applied to the photocoupler PC, a current flowing into the photocoupler PC increases. In turn, oscillation frequency of the oscillator OSC increases, and thereby a voltage charged to the current resonance capacitor Cri when the switching element Q2 is in the ON state decreases. Further, since a voltage applied to the primary winding P of the transformer T also decreases, a voltage of the secondary winding thereof is decreased to a predetermined voltage.

This operation controls the secondary winding voltage itself at a constant value, unlike supply of power by switching disclosed in related arts. When supplying power from the secondary winding to the output, a voltage higher than a charge voltage of the output smoothing capacitor Co plus forward voltages of the diodes D1, D2 are required.

Accordingly, even in the standby mode with the dimming signal Vdim turned OFF, there is no need to stop oscillation operation of the current resonance circuit. At a time period from t1 to t3 in which the OFF time of the dimming signal Vdim is relatively long, the current resonance circuit is controlled in such a manner that a charge voltage Vco of the output smoothing capacitor Co is discharged gradually at time t2 due to a leak current of the output smoothing capacitor Co itself, and the charge voltage Vco is held when decreased down to the output voltage corresponding to 1/(1+R3/R2) times of the voltage in the constant current mode.

Even when the dimming signal Vdim is inverted from OFF to ON at time t3, this configuration increases the output voltage efficiently and quickly (at time t3 to t4), and allows the load current at a constant value to flow, without needing a flow of a standby current.

Next, at time t5 to t6, when the dimming signal Vdim having a short cycle is inputted, discharging of the output smoothing capacitor Co described above does not occur, and the output voltage Vnom is maintained approximately. Then at time t6, operation shifts to the ON operation of the dimming signal Vdim.

The zener diode ZD1 has an over voltage protection function controlled so that it may not become the output voltage exceeding a zener voltage of the zener diode when the output voltage rises unusually.

As described above, according to the first embodiment, the constant current power supply device can control the output voltage at a setup voltage lower than an operating voltage without flowing a standby current, since the control circuit 20 holds the error signal just before the dimming signal Vdim is turned from ON to OFF, and increases the amplification ratio of the error amplifier OP1 by a predetermined magnification ratio when the dimming signal Vdim is in the OFF period.

Second Embodiment

Figure 6:
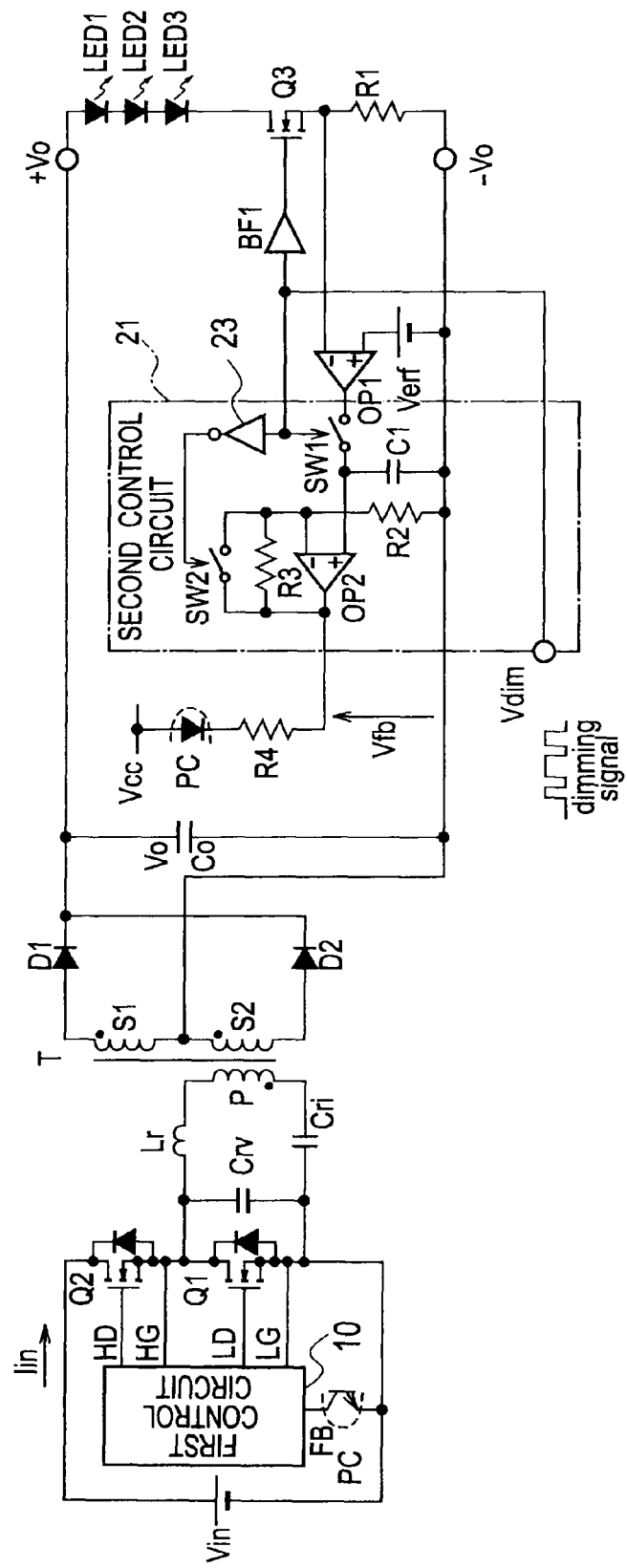
FIG. 6 is a block diagram showing a configuration of a constant current power supply device according to a second embodiment of the present invention.

FIG. 6 is a block diagram showing a configuration of a constant current power supply device according to a second embodiment of the present invention. In the constant current power supply device according to the second embodiment, the inverting input terminal and the non-inverting input terminal of the error amplifier OP1 according to the first embodiment are replaced with each other. An inverter 23 is provided between the switch SW1 and the switch SW2 to invert ON/OFF of the switch SW2 and ON/OFF of the switch SW1.

Between the power supply Vcc and an output terminal of the error amplifier OP2, a series circuit comprising a photodiode of the photocoupler PC and a resistor R4 is connected. That is, the photocoupler PC is driven with a sink current supplied from an output of the error amplifier OP2.

In the configuration modified as described above, when the dimming signal is turned ON, the amplification ratio of the error amplifier OP2 is multiplied by (1+R3/R2) times so as to control the output current, and when the dimming signal is turned OFF, the amplification ratio of the error amplifier OP2 is adjusted to 1 time thereof to increase current flowing into the photocoupler PC so as to control the output voltage.

Next, operation of the constant current power supply device according to the second embodiment is described with reference to FIG. 7.

At time t10, operation according to the second embodiment is basically same as the operation at t0 in FIG. 5 of the constant current power supply device according to the first embodiment. Therefore, only different operations are described hereinafter.

At time t10, switches SW1, SW2 are turned ON/OFF in synchronization with a H/L level of the dimming signal Vdim. Thus, since the switch SW2 is in the OFF state when the dimming signal Vdim is at the H level, the resistor R3 connected to the output terminal and the inverting input terminal of the error amplifier OP2 is released by the switch SW2. Thus, when the dimming signal Vdim is at the H level, the amplification ratio of the error amplifier OP2 is multiplied by (1+R3/R2) times so as to control the current of the photocoupler PC.

Thus, the current resonance power supply circuit is controlled such that current flowing through loads LED1 to LED3 becomes a constant current based on the error signal of the error amplifier OP1.

Next, at time t11, when the dimming signal Vdim is turned OFF to the L level, the MOSFET Q3 and the switch SW1 are turned OFF, and the switch SW2 is turned ON, whereby current flowing through loads LED1 to LED3 stops.

Here, since the switch SW1 is inverted from ON to OFF, the error signal sent from the error amplifier OP1 when a voltage between both ends of the current detection resistor R1 is zero voltage is not inputted into the feedback terminal FB of the current resonance power supply circuit, and instead, a charge voltage of the capacitor C1 holding a signal in the constant current mode is inputted continuously thereto.

However, the switch SW2, which is turned from ON to OFF at the same time, short-circuits the resistor R3 and between the output terminal and the inverting input terminal of the error amplifier OP2. Thus, the error amplifier OP2 becomes a voltage follower acting such that a voltage of the inverting input terminal becomes a voltage same as a voltage of the non-inverting input terminal.

In consequence, the amplification ratio of the error amplifier OP2 changes to 1 time of the voltage follower from the amplification ratio of (1+R3/R2) times corresponding to the ratio of the resistor R3 being a negative feedback resistance to the input resistor R2 of the inverting input terminal. Accordingly, the error amplifier OP2 outputs a voltage of 1/(1+R3/R2) times of the charge voltage of the capacitor C1.

That is, since the output voltage of the error amplifier OP2 decreases, a voltage corresponding to a difference between a voltage Vcc and the output voltage of the error amplifier OP2 is applied to a series circuit comprising the photocoupler PC and the resistor R4, whereby a current multiplied by (1+R3/R2) times flows into the photocoupler PC.

In consequence, oscillation frequency of the oscillator OSC rises, and a voltage charged to the current resonance capacitor Cri when the switching element Q2 is turned ON decreases. Further, since a voltage applied to the primary winding P of the transformer T also decreases, a voltage of the secondary winding decreases to a predetermined voltage.

That is, the current resonance power supply circuit is controlled in reverse proportion to the current of the photocoupler PC. Therefore, the output voltage is controlled at 1/(1+R3/R2) times of the output voltage in the constant current mode when the dimming signal Vdim is turned ON.

As described above, the constant current power supply device according to the second embodiment can control the output voltage at a setup voltage lower than an operating voltage without flowing a standby current, since the second control circuit 21 holds the error signal just before the dimming signal Vdim is turned from ON to OFF, and decreases the amplification ratio of the error amplifier OP1 by a predetermined magnification ratio in the OFF period of the dimming signal Vdim. That is, similar effects as the constant current power supply device according to the first embodiment can be obtained in a configuration in which only the second control circuit 21 and peripheral circuits thereof are modified.

According to the present invention, the second control circuit holds the error signal just before an external signal is turned from ON to OFF, and increases or decreases amplification factor of the error amplifier by a predetermined magnification factor in the OFF period of the external signal, whereby the output voltage can be controlled at a setup voltage lower than an operating voltage.

The present invention can be applied to an LED lighting apparatus, an LED illumination apparatus, and the like.

What is claimed is:

1. A constant current power supply device comprising:
   a direct current power supply;
   a first series circuit connected to both ends of the direct current power supply, and including a first switching element and a second switching element connected together in series;
   a first control circuit configured to turn ON/OFF the first switching element and the second switching element alternately;
   a second series circuit connected to both ends of the first switching element or the second switching element, and including a reactor, a primary winding of a transformer and a current resonance capacitor connected together in series;
   a rectifying and smoothing circuit configured to output an output voltage by rectifying and smoothing a voltage generated in a secondary winding of the transformer;
   a third series circuit connected to both ends of the rectifying and smoothing circuit, and including a load, a switching element and a current detection resistor connected together in series, the switching element configured to control ON/OFF of a load current flowing into the load according to an ON/OFF signal received from an external signal;
   an error amplifier configured to amplify an error signal of an error voltage between a voltage of the current detection resistor and a reference voltage; and
   a second control circuit configured to sample and hold the error signal from the error amplifier when the external signal is in an ON period, output the error signal to the first control circuit, hold the error signal just before the external signal is turned from ON to OFF, change an amplification ratio of the error amplifier by a predetermined magnification ratio when the external signal is in an OFF period, and output the changed error signal to the first output circuit.

2. The constant current power supply device according to claim 1, wherein the first control circuit controls the load current by changing a frequency at which the first switching element and the second switching element are alternately turned ON/OFF, according to a signal level of the error signal from the second control circuit.

3. The constant current power supply device according to claim 1, wherein the second control circuit sets the output voltage of the rectifying and smoothing circuit by lowering the output voltage according to the predetermined magnification ratio by which the amplification ratio of the error amplifier is changed in the OFF period of the external signal.

4. The constant current power control device according to claim 2, wherein the second control circuit sets the output voltage of the rectifying and smoothing circuit by lowering the output voltage according to the predetermined magnification ratio by which the amplification ratio of the error amplifier is changed in the OFF period of the external signal.

5. The constant current power supply device according to claim 1, wherein the load is an LED.

* * * * *